Figure 2:
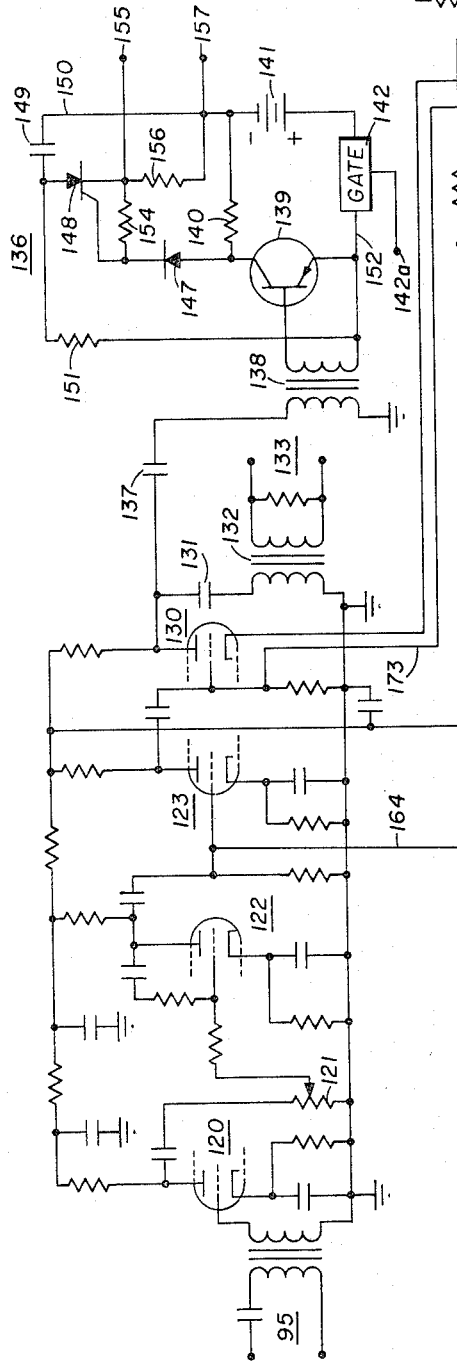

Dec. 13, 1966          H. F. HINES ETAL          3,292,141
MARINE NORMAL MOVEOUT DETERMINATION
Filed Dec. 24, 1964          2 Sheets-Sheet 1
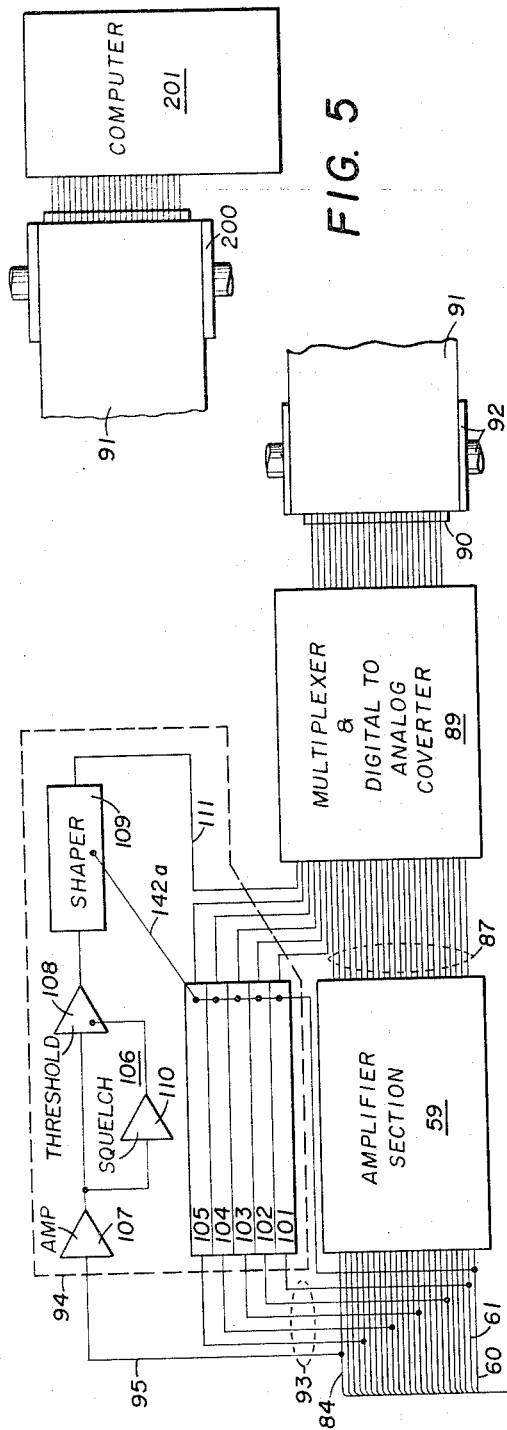
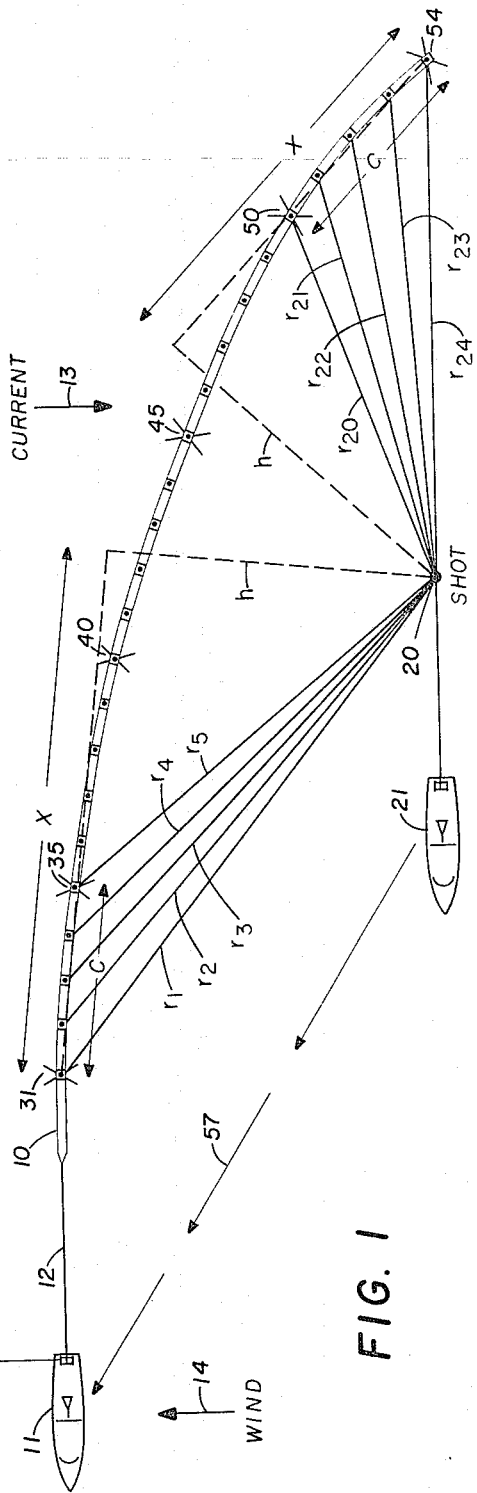

Dec. 13, 1966  H. F. HINES ETAL  3,292,141
MARINE NORMAL MOVEOUT DETERMINATION
Filed Dec. 24, 1964  2 Sheets-Sheet 2

United States Patent Office 3,292,141
Patented Dec. 13, 1966

3,292,141
MARINE NORMAL MOVEOUT DETERMINATION
Harley F. Hines, Metairie, La., and Edward R. Prince, Jr., Dallas, Tex., assignors to Texas Instruments Incorporated, Dallas, Tex., a corporation of Delaware
Filed Dec. 24, 1964, Ser. No. 420,942
8 Claims. (Cl. 340—7)

This invention relates to marine seismic exploration, and more particularly, to the automatic shot-to-seismometer spacing determination to make possible normal movement correction of marine seismic data. In a more specific aspect, the invention relates to concurrent recording of first breaks and reflection data in reproducible form.

A marine seismogram is generally obtained by towing a streamer or floating cable, with which are associated groups of seismometers. An explosive charge is set off in the water and a portion of the waves travel into the earth and are reflected back to the seismometers from boundaries where a change of velocity occurs. Due to the variation in distance between the shot and each group of seismometers, the energy reflected from the same subsurface layer arrives at each group of seismometers at a different time. This "normal moveout" of the energy across the spread must be corrected for in order to obtain a meaningful interpretation of the seismogram. To do so requires a knowledge of the distance between the shot and each group of receivers. Unlike seismic exploration work on land, the location of the shot and each siesmometer group in marine work is never known precisely with respect to any fixed point. Water break amplifiers have been used in conventional recording operations where visual seismic records are produced to amplify that portion of the shot energy which takes the most direct path through the water to the seismometer group and to produce a sharply breaking pulse upon receiving such energy. The distance from the shot to the seismometer group can then be determined from this water travel time and the seismic wave velocity in water. Since the cable or streamer is being towed it is generally taut at all times. However, depending on wind and the prevailing currents, it is seldom straight over its entire length. Because of streamer tautness it is not necessary to have a water break amplifier for every seismometer group along the cable but because of the curvature it is necessary to have one for various groups which are evenly spaced over the entire length of the cable. The assumption may then be made that any curvature between groups for which water break amplifiers exist is negligible.

The output pulses from the water break amplifiers recorded photographically as wiggle-trace recordings have been employed by an interpreter who would make the necessary calculations to determine the shot-to-detector distances. Thereafter he would apply the resultant information to the normal moveout computations.

In accordance with U.S. Patent No. 3,134,957 to Foote et al., seismic reflection data is recorded in digital form so that the resultant reproducible record can be fed directly into a data processing unit wherein the normal moveout corrections can be carried out automatically. However, in marine operations where the shot-to-detector distances are not accurately known, the normal moveout computations are rendered ambiguous and unreliable.

In accordance with the present invention, a set of marine seismic signals multiplexed into digital form are corrected by concurrently generating a persistent pulse at a time corresponding with the water break pulse in each of the preselected sub set of the seismic signals. The pulses are sequentially sampled and converted into a plurality of digital water break signals. The water break signals are then recorded in reproducible form on the same time base as the set of seismic signals. The recorded signals are then reproduced and distances from said seismic disturbance to each of the detectors are computed as a basis for normal moveout correction.

Figure 4:
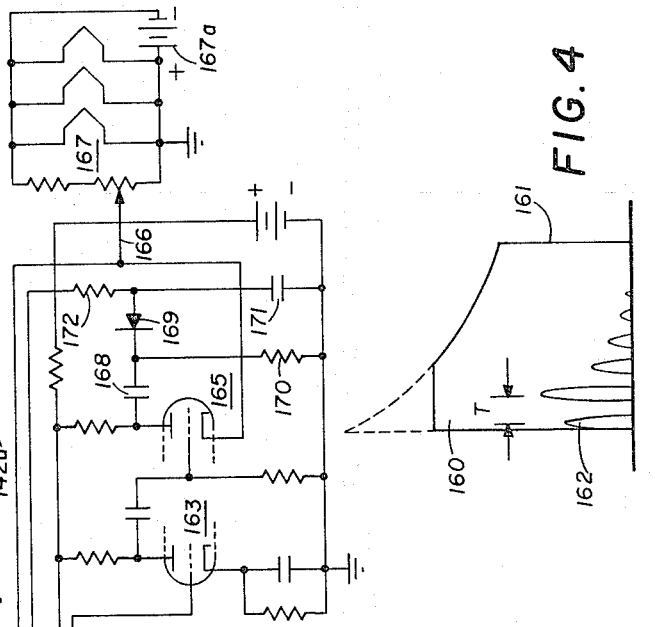
Figure 3:
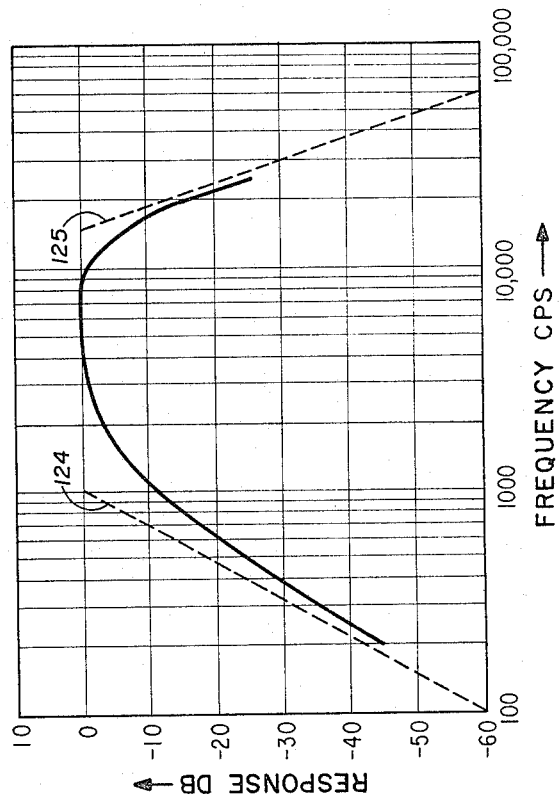

For a more complete understanding of the present invention and for further objects and advantages thereof, reference may now be had to the following description taken in conjunction with the accompanying drawings in which:

FIGURE 1 illustrates one embodiment of the present invention;
FIGURE 2 illustrates the first break shaping unit;
FIGURE 3 is a graph showing the frequency response of the unit of FIGURE 2;
FIGURE 4 illustrates the shaped water break pulse; and
FIGURE 5 illustrates utilization of the data recorded in the system of FIGURE 1.

In FIGURE 1, a seismic detecting streamer 10 is towed behind the boat 11 along a predetermined course. Ideally, the streamer 10 as towed by cable 12 should extend along a straight line behind the boat 11. However, more generally, the water current as represented by the arrow 13 and wind as represented by the arrow 14, are effective to alter the position of the streamer 10 and boat 11 relative to the preset course. Often, the boat 11 halts during the time interval that a seismic record is being obtained. Movement of streamer and boat during such intervals in general are in no way related to each other and the exact position of the various detectors relative to a given shot location is unknown.

Following a given shot, surveying apparatus on boat 11 may indicate the deviation of the boat from its desired course, thus requiring an abrupt change in direction to get back on course. As a result, streamer 10 may follow a serpentine path through the water.

A shot 20 from a boat 21 is detonated to produce seismic waves which are detected by the detectors in the streamer 10. In the operation illustrated in FIGURE 1, the streamer 10 includes twenty-four detectors 31–54. The exploration program illustrated detonates the shot 20 at a point midway of the length of the streamer 10 and spaced laterally therefrom for broadside shooting operation. The irregularity in the lengths of the shot-seismometer distances $r_1$–$r_{24}$ is readily apparent.

A time break or shot instant signal is transmitted to the boat 11 from boat 21, as indicated by the radio transmission path 57. Recording instruments carried by boat 11 then serve to apply a time break signal and a timing or clock signal, by way of channel 60, to a multichannel preamplifier unit 59. Similarly, signals from detector 31 are applied to the multichannel amplifier unit 59 by way of channel 61. All of the signals from the detectors 31–54 similarly are applied to the unit 59, with the signal from the most remote detector being applied by way of channel 84. The signals applied to the unit 59 are then applied by way of channels 87 to a multiplexer and analog-to-digital converter section 89. The output of the analog-to-digital converter is then applied by way of recording heads 90 to a tape 91, driven at a uniform speed by a tape transport unit generically represented by a capstan 92. By this means, the time break and timing signal, as well as the set signals from the detectors 31–54, are stored in digital form on the tape 91.

In accordance with the present invention, signals forming a preselected sub set of signals are applied by way of channels 93 to a water break amplifier and shaper section 94. In the embodiment illustrated, the signals from detectors 31, 35, 40, 45, 50, and 54 are applied to section 94. Six channels are provided in section 94 so that six water break signals can be recorded on the tape 91. Channels 101–106 respectively serve to shape the water break pulse from amplifiers 31, 35, 40, 45, 50, and 54, respectively. Channels 101–105 have been shown in block form only. Channel 106 has been shown in more detail and includes an amplifier 107, a threshold sending unit 108 and a shaper 109. A squelch circuit 110 serves to cut off the signal after the water break signal has been sensed. The output of the shaper is then applied by way of channel 111 to the multiplexer and converter unit 89. In a similar manner, the outputs of each of units 101–105 are applied to the multiplexer and converter unit 89. Thus, the time break signal, the timing signal, the seismic reflection signals from detectors 31–55, and water break signals from the detectors 31, 35, 40, 45, 50, and 54 are stored in digital form on tape 91.

With the signals thus recorded, the tape 91 may be processed without the necessity of any individual making visual interpretation of a seismic record to determine the first break record times for computational purposes. The seismic data on the tape 91 may then be fed directly to a computer wherein the first operation is to measure the various first break times represented by the paths $r1$, $r5$, $r10$, $r15$, $r20$, and $r24$ and then compute the shot-detector distance for each of the 24 detectors. Thereafter, with the shot-detector distances known, the normal moveout computation may be completed so that the data may then be recorded in visual form, displayed or otherwise processed to reveal accurately the depths and altitudes of subsurface reflecting horizons of interest. Recording of the water break data concurrently with the seismic reflection data eliminates the need for a human intermediary at any point in the data processing operation.

In FIGURE 2 one embodiment of the water break channel has been illustrated in detail. The input channel 95 of FIGURE 1 has been shown in FIGURE 2 as transformer coupled to a preamplifier 120. The output of the preamplifier 120 is coupled by way of a variable potentiometer 121 to the first of two class A band pass amplifier stages 122 and 123. The frequency response of this portion of the amplifier is shown in FIGURE 3. The low frequency corner occurs at about 1 kilocycle. The characteristic slope at the low end of the frequency response curve is about the same as a passive three-section RC filter network which has a slope of 18 db per octave. The high frequency corner occurs at about 15 kc. and has a slope of about 30 db per octave. Thus, the amplifier has a useful pass band between 1 and 15 kc. Since the dominant seismic frequency is down about an octave, the signal from the amplifier will be at the lower end of the band.

The class A amplifier portion 122, 123 has a maximum gain of about 70 db. The last stage 130 of the amplifier is normally biased to cut off. The signal must exceed a threshold amplitude level before the tube in stage 130 can conduct. The action of stage 130 is to act as a half wave rectifier. If the phase of the water break arrival is incorrect, only half cycle resolution can be obtained.

For preferred operation, the signal at the grid of the tube in stage 130 must be positive going at the onset of the water break to turn the stage on. One output of the stage 130 is blocked as to D.C. by a capacitor 131.

The A.C. component of the signal is coupled by a transformer 132 to a galvanometer circuit 133 so that where desired, a visual wiggle-trace recording may be produced by use of a conventional recorder.

In accordance with the present invention, the signal from stage 130 is coupled to a shaper circuit 136 by way of coupling capacitor 137. The signal is applied by way of transformer 138 to the emitter-base circuit of a transistor 139. The collector transistor 139 is connected by way of resistor 140 and battery 141 to one terminal of a gate 142. The collector of transistor 139 is also connected by way of diode 147 to the input of a silicon controlled rectifier 148. One terminal of a storage capacitor 149 is connected to battery 141. The charging circuit for capacitor 149 by battery 141 includes conductor 150 leading to one side of capacitor 149. A resistor 151 and conductor 152 lead to the other side of capacitor 149 from gate 142. The diode 147 is connected by way of resistor 154 to an output terminal 155 which is common to the cathode of silicon controlled rectifier 148. A resistor 156 is connected between terminal 155 and conductor 150. Thus, the second output terminal 157 is connected to conductor 150.

In operation, gate 142 is closed in response to the time break to initiate charging of condenser 149 through resistor 151. When the stage 130 conducts, the signal applied to the base of the transistor 139 triggers the silicon controlled rectifier 148 to discharge condenser 149. The discharge of the condenser 149 produces an output pulse having a waveform generally as shown by the solid outline in FIGURE 4.

Pulse 160 has an abrupt onset and persists for an interval substantially greater than the interval between samples taken of a given trace by multiplexer. As illustrated in FIGURE 4, the half wave rectified alternating current signal at the output of amplifier stage 123 is very high in frequency and is such that the wave form 162 shown in FIGURE 4 might be missed by the sampling operation of the multiplexer. However, with the wave form 160 persisting for a substantial period, the multiplexing operation may be carried out without any possibility of missing the water break pulse. Using the filter illustrated in FIGURE 2, the period T in FIGURE 4 for the water break pulse would be less than 0.001 second and in general is in the frequency range of well above 1000 cycles. By producing a signal from each of the water break channels which has persistence greater than the sampling interval there will be avoided any ambiguity in the water pulse signals. In general, the sampling rate of the multiplexer is about 0.002 second.

Conduction through the transistor 139 is terminated by squelching the stage 130. More particularly, the squelch circuit consists of a class A amplifier stage 163 having its input connected to the output of the stage 122. The stage 163 is thus connected in parallel with the stage 123. The amplifier stage 163 drives a normally cut off stage 165 which is biased at the same level as stage 130. It will be noted that the bias voltage for stages 130 and 165 is developed on conductor 166 from a potentiometer in the circuit 167 which is powered by D.C. source 167a for energization of the filaments of the various amplifier tubes. The output signal from the stage 165 is coupled by way of capacitor 168 to a diode 169. The cathode of the diode 169 is connected to ground by way of resistor 170. Thus the output signal from the stage 165 is half wave rectified and is applied by way of the diode 169 to the control grid of stage 130. The output of stage 165 is further filtered by the action of the condenser 171 and resistor 172, the anode of the diode 169 being coupled to the control grid of stage 130 by way of resistor 172 and conductor 173.

The action of the squelch circuit is to provide a negative D.C. bias level which is proportional to the average half cycle amplitude of the signal from the stage 165. Thus a reverse bias voltage is applied to the grid of the stage 130 through the resistor 172. The time constant of the circuit comprising resistor 172 and capacitor 171 is such that only a few cycles of the water break arrival are permitted to overcome the threshold bias of the stage 130. Stage 130 produces an exponentially decaying half cycle alternating current output at the signal arrival time. This is because the D.C. level of the squelch output exponentially decreases from ground level, at quiescence, to a maximum of about —24 volts D.C. at the arrival of the large signal. The actual squelch D.C. level varies with the input signal amplitude and the amplifier gain setting. However, when the cathode bias levels at stages 130 and 165 are properly adjusted, the squelching action is effective to overcome the dynamic range of the amplifier for any change in signal that can overcome the threshold level at stage 130. Preferably the maximum gain setting for the amplifier as controlled by the potentiometer 121 is a function of the ambient noise level from the marine seismometer streamer 10. That is to say, the average noise level generated before the shot is detonated to determine the gain setting. The gain setting is such that the ambient noise level will not produce any output from stage 130. It is preferable that the gain be maintained at a level substantially below that level at which the noise will actuate stage 130 but at a sufficient gain such that the first break or the water break will drive the normally cut off stages 130 and 165 to appreciable conduction.

The production of the output pulse 160 at terminals 155–157 makes certain that the multiplexer and converter unit 89 will not miss the first water break pulse even though an extremely high frequency component of the water break signal is employed. The persistence of the pulse 160 for a time interval longer than the interval between samples of a given trace taken by multiplexer and converter unit 89 eliminates the possibility that the water break pulse will be missed.

The amplifiers and the multiplexer, and the converter units illustrated in FIGURE 1 have not been described in detail since they are known and described in the aforesaid Foote et al. Patent 3,134,957. The streamer 10 may be of construction generally conforming with that illustrated and described in U.S. Patent 2,465,696 to Paisley. Such pressure sensitive streamers, in preferred form, are sold by Seismic Engineering Company of Dallas, Texas, and are identified as Line Streamer Sections.

Water break channels will be used in number only to the extent necessary and practical. This in no way affects the operation in which the water break pulses are permanently recorded on magnetic tape. In the course of data processing, the shot-to-seismometer distances are automatically determined on the basis of the recorded arrival times of these pulses. If fewer amplifiers are used than the number of groups in the spread, the remaining distances are solved by triangulation to determine the distance from the shot to all groups.

The following example will illustrate the procedure more clearly. Assume a streamer of length L with 24 evenly spaced groups and a water break amplifier for groups 1, 5, 10, 15, 20, and 24 as in FIGURE 1. The shooting procedure is that for a split profile with the shot offset broadside from the cable. Calculation of distances to groups intermediate to two adjacent water break groups $i$ and $j$ will be in accordance with the following expressions:

$$x = \frac{r^2 - r_i^2 + c^2}{2c} \quad (1)$$

$$h = \sqrt{r_i^2 - x^2} \quad (2)$$

where:

$x$ and $h$ are the distances shown in FIGURE 1;

$r_i$ and $r_j$ are the distances to the two adjacent water break groups;

$r_i \geq r_j$; and $$c = \left| \frac{i-j}{23} \right| L$$

If $i < j$ $$r_{i+k} = \sqrt{h^2 + |x - k\Delta c|^2} \quad (3)$$

If $i > j$ $$r_{j+k} = \sqrt{h^2 + |x - c + k\Delta c|^2} \quad (4)$$

where:

$k = 1, 2, \ldots (|i-j|-1)$ and $$\Delta c = \frac{1}{23} L$$

As shown in FIGURE 5, the tape 91 is applied to a playback unit 200 which finds a computer 201 where the foregoing computations are carried out in connection with normal moveout correction. Computer 201 may be of the type described in U.S. Patent 3,074,636 to Baker et al. Computer 201 is programmed to include the operations represented by Equations 1–4. Thus, in accordance with the invention, there is provided a method of marine seismic exploration where a plurality of seismic signals from a trailing streamer are sequentially sampled at a high rate for recording in digital form on a real time base. Concurrently with the recording of the seismic signals, the first breaks in each of a predetermined sub set of the signals are sensed. For each first break, a signal having an abrupt onset corresponding in time with the first break and of duration greater than the sampling interval is generated. The signal is then sampled and stored on the same time base as the seismic data.

In accordance with the invention, a marine seismic exploration method and system are provided in connection with which a seismic disturbance is produced at a marine shot location and acoustic energy generated by the seismic disturbance is detected at spaced points to produce a series of electrical signals. The amplitudes of the signals are sequentially sampled and converted into digital signals. The latter signals are reproducibly recorded on a real time base referenced to the time of occurrence of the seismic disturbance. The first break energy in each of the signals of a sub set are converted into a waveform persisting over a period greater than the digital sampling interval. The persistent waveforms are then converted into digital signals and are recorded on the same time base as the entire series of digital signals. The signals thus recorded may be reproduced signals representative of the first break signals to compute the distance from the seismic disturbance to the detectors of said sub set. Based on such distances, remaining signals may be corrected for normal moveout.

Having described the invention in connection with the specific embodiments shown in the drawings, it will now be apparent to those skilled in the art that modifications may be made therein and it is intended to cover such modifications as fall within the scope of the appended claims.

What is claimed is:

1. In marine seismic exploration, the method which comprises:
   (a) producing a seismic disturbance at a marine shot location,
   (b) receiving acoustic energy generated by said seismic disturbance at spaced points in the vicinity of said location disturbance to produce a series of electrical signals,
   (c) sequentially sampling the amplitudes of said signals,
   (d) converting the sampled electrical amplitudes into digital signals,
   (e) magnetically recording said digital signals on a real time base referenced to the time of occurrence of said seismic disturbance,
(f) converting the first break energy in each of the signals of a sub set of said electrical signals into digital signals, and
(g) recording the latter digital signals on said time base.

2. A method of seismic exploration, which comprises:
(a) producing a seismic disturbance at a marine shot location,
(b) receiving acoustic energy generated by said seismic disturbance at spaced points in the vicinity of said location to produce a series of electrical signals,
(c) sequentially sampling the amplitudes of said signals,
(d) converting the sampled electrical amplitudes into digital signals,
(e) magnetically recording said digital signals on a real time base referenced to the time of occurrence of said seismic disturbance,
(f) converting the first break energy in each of the signals in a sub set of said electrcal signals into a waveform persisting over a period greater than the digital sampling interval,
(g) converting the onsets of the persistent waveforms into digital signals, and
(h) recording the latter digital signals on said time base.

3. In marine seismic exploration, the method which comprises:
(a) producing a seismic disturbance at a marine shot location,
(b) receiving acoustic energy generated by said seismic disturbance at spaced points in the vicinity of said location to produce a series of electrical signals,
(c) sequentially sampling the amplitudes of said signals,
(d) converting the sampled electrical amplitudes into digital signals,
(e) reproducibly recording said digital signals on a real time base referenced to the time of occurrence of said seismic disturbance,
(f) converting the first break energy in each of said signals of a sub set into a waveform persisting over a period greater than the digital sampling interval,
(g) converting the onset of the persistent waveform into digital signals,
(h) recording the latter digital signals on said time base,
(i) reproducing the recorded digital signals,
(j) generating in response to the reproduced digital signals representative of said first break signals a physical condition representing the distance from seismic disturbance to the detectors of said sub set, and
(k) in response to said physical condition, modifying the remaining reproduced digital signals to correct for normal moveout.

4. In a marine seismic exploration system wherein detectors spaced along a towing member move along a traverse at a predetermined depth, the combination therewith which comprises:
(a) analog-digital conversion means responsive to the output signals from each of said detectors concurrently to produce digital functions representative of the signals from said detectors,
(b) a recorder responsive to the output of said conversion means to produce reproducible recordings of said functions,
(c) high frequency channels individually connected to a selected subgroup of said detectors and having means for producing persistent output signals beginning in response to the first breaks in the signals from said subgroup, and
(d) circuit means for applying said output signals from said high frequency channels to said conversion means concurrently to record in reproducible form the time occurrences of said first break energy.

5. In a marine seismic exploration system wherein detectors spaced along a towing member move along a traverse at a predetermined depth, the combination therewith which comprises:
(a) analog-digital conversion means responsive to the output signals from each of said detectors concurrently to produce digital functions representative of the amplitudes of each of the signals from said detectors at time-spaced sampling intervals,
(b) a recorder responsive to the output of said conversion means to produce reproducible recordings of said functions,
(c) high frequency channels individually connected to a selected subgroup of said detectors and having means for producing output signals each persistent for a period in excess of said sampling interval and beginning in response to the first breaks in the signals from said subgroup, and
(d) circuit means for applying said output signals from said high frequency channels through said conversion means to said recorder concurrently to record in reproducible form the time occurrences of said first break energy.

6. In a marine seismic exploration system wherein detectors spaced along a towing member move along a traverse at a predetermined depth, the combination therewith which comprises:
(a) analog-digital conversion means responsive to the output signals from each of said detectors concurrently to produce digital functions representative of the amplitudes of each of the signals from said detectors at time-spaced sampling intervals,
(b) a multiplexer for serially combining said signals,
(c) a recorder responsive to the output of the multiplexer means to produce reproducible recordings of said functions,
(d) high frequency channels individually connected to a selected subgroup of said detectors and having means for producing output signals each persistent for a period in excess of said sampling interval and beginning in response to the first breaks in the signals from said subgroup, and
(e) circuit means for applying said output signals from said high frequency channels through said conversion means and said multiplexer to said recorder concurrently to record in reproducible form the time occurrences of said first break energy.

7. In a marine seismic exploration system wherein detectors dispersed in a first spacing one from another along a towing member move along a traverse at a predetermined depth, the combination therewith which comprises:
(a) analog-digital conversion means responsive to the output signals from each of said detectors concurrently to produce digital functions representative of the signals from said detectors,
(b) a recorder responsive to the output of said conversion means to produce reproducible recordings of said functions,
(c) high frequency channels individually connected to a fraction of said detectors wherein the detectors of said fraction are dispersed one from another in a second spacing, said channels each having means for producing persistent output signals beginning in response to high frequency content of the first breaks in the signals from said fraction, and
(d) circuit means for applying the output signals from said high frequency channels to said conversion means concurrently to record in reproducible form the time occurrences of said first break energy.

8. In a marine seismic exploration system wherein detectors spaced along a towing member move along a traverse at a predetermined depth, the combination therewith which comprises:
(a) analog-digital conversion means responsive to the output signals from each of said detectors concurrently to produce digital functions representative of the signals from said detectors,
(b) a recorder responsive to the output of said conversion means to produce reproducible recordings of said functions,
(c) first break channels individually connected to a selected subgroup of said detectors and having a high pass filter whose low frequency cutoff is above the dominant frequency of said output signals,
(d) shaping means responsive to the outputs of said channels for producing persistent output signals beginning in response to the first breaks in the signals from said subgroup, and
(e) circuit means for applying said output signals from said shaping means to said conversion means concurrently to record in reproducible form representations of the time occurrences of said first break energy.

No references cited.

BENJAMIN A. BORCHELT, *Primary Examiner.*

P. A. SHANLEY, *Assistant Examiner.*